United States Patent
Narita et al.

(10) Patent No.: US 7,358,205 B2
(45) Date of Patent: Apr. 15, 2008

(54) ALKALI-FREE GLASS SUBSTRATE

(75) Inventors: Toshiharu Narita, Otsu (JP); Tatsuya Takaya, Otsu (JP); Masahiro Tomamoto, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 605 days.

(21) Appl. No.: 10/931,227

(22) Filed: Sep. 1, 2004

(65) Prior Publication Data

US 2005/0065014 A1    Mar. 24, 2005

(30) Foreign Application Priority Data

Sep. 2, 2003  (JP) .............. 2003-309572
Jul. 21, 2004 (JP) .............. 2004-212969

(51) Int. Cl.
*C03C 3/091* (2006.01)
*C03C 3/093* (2006.01)

(52) U.S. Cl. .......................... 501/66; 501/67

(58) Field of Classification Search ................. 501/66, 501/67
See application file for complete search history.

(56) References Cited

U.S. PATENT DOCUMENTS

| | | | |
|---|---|---|---|
| 4,605,632 A | 8/1986 | Elmer | 501/54 |
| 5,374,595 A | 12/1994 | Dumbaugh, Jr. et al. | 501/66 |
| 5,446,008 A | 8/1995 | Krolla et al. | 501/68 |
| 5,785,726 A | 7/1998 | Dorfeld et al. | 65/134.1 |
| 5,824,127 A | 10/1998 | Bange et al. | 65/90 |
| 6,128,924 A | 10/2000 | Bange et al. | 65/90 |
| 6,413,906 B1 * | 7/2002 | Shimatani et al. | 501/4 |
| 6,468,933 B1 | 10/2002 | Narita et al. | 501/56 |
| 6,593,258 B1 * | 7/2003 | Shimatani et al. | 501/4 |
| 6,933,253 B2 * | 8/2005 | Naka et al. | 501/67 |
| 7,153,795 B2 | 12/2006 | Comte et al. | 501/4 |
| 2001/0039812 A1 | 11/2001 | Romer et al. | 65/134.1 |
| 2002/0151426 A1 | 10/2002 | Murata et al. | 501/66 |
| 2004/0186000 A1 | 9/2004 | Kawamoto et al. | 501/66 |

FOREIGN PATENT DOCUMENTS

| | | |
|---|---|---|
| EP | 0 884 287 A1 | 12/1998 |
| EP | 1 074 520 A1 | 2/2001 |
| JP | 6-263473 A | 9/1994 |
| JP | 2001-500098 A | 1/2001 |
| WO | 98/03442 A1 | 1/1998 |
| WO | 03/066539 A1 | 8/2003 |

* cited by examiner

*Primary Examiner*—Karl Group
(74) *Attorney, Agent, or Firm*—Kubovcik & Kubovcik

(57) ABSTRACT

An alkali-free glass substrate containing, by mass percent, 50-70% of $SiO_2$, 10-25% of $Al_2O_3$, 5-20% of $B_2O_3$, 0-10% of MgO, 0-15% of CaO, 0-10% of BaO, 0-10% of SrO and 0-5% of ZnO, also containing $SnO_2$ and/or $Sb_2O_3$ and having a β-OH value of at least 0.485/mm.

9 Claims, No Drawings

ALKALI-FREE GLASS SUBSTRATE

BACKGROUND OF THE INVENTION

1. Field of the Invention

The present invention relates to an alkali-free glass substrate, more particularly to an alkali-free glass substrate useful as a transparent glass substrate for displays and others.

2. Description of Related Art

Conventionally, an alkali-free glass has been used as a transparent glass for liquid crystal displays. The alkali-free glass particularly for display application is required to be free of bubbles that result in display defects, as well as having satisfactory heat resistance and chemical durability.

For such an alkali-free glass, various types of glasses have been proposed. For example, Japanese Patent Kokai No. Hei 6-263473 and Japanese Patent Kohyo No. 2001-500098 disclose alkali-free aluminosilicate glasses.

If a bubble-free glass is to be obtained, a gas produced during a batch decomposition must be expelled from a glass melt by a fining gas. In addition, the remaining minute bubbles must be removed during homogenization melting by the reproduced fining gas which renders them larger in sizes and thereby causes them to float in the melt.

For the alkali-free glass, particularly for use as a glass substrate for liquid crystal displays, a glass melt has a high viscosity and its melting is carried out at higher temperatures compared to alkali-containing glasses.

For this type of alkali-free glass, a batch decomposition occurs generally at 1,300-1,500° C. Accordingly, fining and homogenization are carried out at 1,500° C. or higher temperatures. Under such conditions, $As_2O_3$ has been widely used as a fining agent which can release a fining gas over a wide temperature range (approximate range of 1,300-1,700° C.).

However, $As_2O_3$ is very toxic in nature and possibly causes environmental pollution during glass manufacturing processes or waste glass treatments. For this reason, its use is being increasingly limited.

SUMMARY OF THE INVENTION

It is an object of the present invention to provide an alkali-free glass substrate rendered free of bubbles resulting in display defects without using $As_2O_3$ as a fining agent.

After conduction of various experiments, the inventors of this application have found that the above object can be achieved by using $Sb_2O_3$ or $SnO_2$ as a fining agent and controlling a water content in the glass at at least a specific level.

That is, the alkali-free glass substrate of the present invention is characterized as comprising a glass which has a β-OH value of at least 0.485/mm and contains $SnO_2$ and/or $Sb_2O_3$.

The preferred β-OH value is 0.5/mm or larger.

The alkali-free glass substrate preferably comprises a glass containing, by mass percent, 50-70% $SiO_2$, 10-25% $Al_2O_3$, 5-20% $B_2O_3$, 0-10% MgO, 0-15% CaO, 0-10% BaO, 0-10% SrO and 0-5% ZnO.

An $As_2O_3$ content is preferably 0.4% or less by mass. The $SnO_2$ content is preferably 0.05-1% by mass. The $Sb_2O_3$ content is preferably 0.05-3% by mass. A $Cl_2$ content is preferably 0.1% or less by mass.

The glass substrate preferably has an area of at least 0.5 $m^2$.

The alkali-free glass substrate of the present invention is suitable for use as a transparent glass substrate of a liquid crystal display.

Because the alkali-free glass substrate of the present invention comprises a glass rendered free of bubbles resulting in display defects without use of $As_2O_3$, it can be suitably used as a transparent glass substrate for displays. Particularly, this alkali-free glass substrate becomes very advantageous when used in a large size, because such use increases a percentage of non-defectives.

Also, the increased β-OH value enables reduction of the amount of $B_2O_3$ and improves chemical durability.

BEST MODE FOR CARRYING OUT THE INVENTION

Japanese Patent Kohyo No. 2001-500098 discloses that if the β-OH value is maintained below 0.5/mm, preferably below 0.45/mm, formation of bubbles at a platinum interface can be prevented. However, clearing of bubbles produced during an initial stage of melting (e.g., during a batch decomposition), what is called, a fineness improvement is not considered at all in Japanese Patent Kohyo No. 2001-500098. The β-OH value disclosed in Japanese Patent Kohyo No. 2001-500098 indicates a water content level obtained under normal melting conditions. In other words, the disclosed β-OH level is comparable to those for conventional alkali-free glasses.

Surprisingly, it has been clearly shown that the glass is better fined if the β-OH value is increased to at least a specific value. In this invention, the water content in the glass is adjusted to a high level which is difficult to be attained under normal melting conditions. This contemplates to compensate for the deficiency in fining ability that results from the use of $SnO_2$ or $Sb_2O_3$ as an alternative fining agent of $As_2O_3$. The water present in the glass acts to lower viscosity of the glass and, if contained in a large amount, facilitates melting and fining of the glass. Also, the water itself serves as one fining gas to diffuse into bubbles, increase bubble sizes and allow them to float up.

Specifically, $Sb_2O_3$ releases a fining gas in a lower temperature range compared to $As_2O_3$, and accordingly use of $Sb_2O_3$ in a high temperature range (e.g., homogenization melting temperature range) brings a slight shortage of the fining gas. In order to counter such a shortage, the present invention contemplates to allow the glass to contain a large amount of water. The water, if present in a large amount, serves as a fining gas to diffuse into bubbles in the temperature range, thereby compensating for the shortage in volume of the fining gas. On the other hand, $SnO_2$ releases a fining gas in a higher temperature range compared to $As_2O_3$, and accordingly use of $SnO_2$ in a low temperature range (e.g., a batch decomposition temperature range) brings a slight shortage of the fining gas. However, the water, if present in a large amount, lowers viscosity of the glass and facilitates melting thereof in the low temperature range. As a result, the glass is better fined.

The water content in the glass, as indicated by the β-OH value, is at least 0.485/mm, preferably at least 0.5/mm, most preferably at least 0.51/mm. As the water content in the glass increases, the glass viscosity decreases, while the amount of the water diffusing into bubbles increases. As a result, the glass is better fined.

The higher the β-OH value, the better the glass is melted. On the other hand, as the β-OH value increases, the strain point tends to decrease. For such reasons, it is desirable that the β-OH value does not exceed 0.65/mm, particularly 0.6/mm.

The β-OH value, indicative of the water content in the glass, can be calculated from the following equation:

$$\beta\text{-OH} = (1/X)\text{LOG}_{10}(T_1/T_2)$$

where,

X=glass thickness (mm);

$T_1$=transmittance (%) at the reference wavelength 3,846 cm$^{-1}$ (2,600 nm); and $T_2$=minimum transmittance (%) at and near the hydroxyl absorption wavelength 3,600 cm$^{-1}$ (2,800 nm).

The glass substrate of the present invention preferably comprises an aluminosilicate glass. More specifically, it desirably comprises an alkali-free glass having a basic composition containing, by mass percentage, 50-70% $SiO_2$, 10-25% $Al_2O_3$, 5-20% $B_2O_3$, 0-10% MgO, 0-15% CaO, 0-10% BaO, 0-10% SrO and 0-5% ZnO. By "alkali-free", as used in the present invention, it is meant that an alkaline metal oxide ($Li_2O$, $Na_2O$, $K_2O$) content is up to 0.2% by mass.

The reasons why the composition of the alkali-free glass substrate should be brought within the above-specified range are given below.

$SiO_2$ is a network component of the glass. Its content is 50-70%, preferably 55-70%, more preferably 55-65%. If the $SiO_2$ content is below 50%, the chemical resistance of the glass is lowered. Also, its strain point is lowered so that the heat resistance of the glass deteriorates. The $SiO_2$ content of exceeding 70% increases the high-temperature viscosity of the glass so that its melting ability is lowered, as well as increasing the tendency of cristobalite to precipitate via devitrification.

$Al_2O_3$ is a component which improves heat resistance and devitrification tendency of the glass. Its content is 10-25%, preferably 10-20%, more preferably 13-18%. If the $Al_2O_3$ content is less than 10%, a devitrification temperature is markedly elevated to result in the increased occurrence of devitrification in the glass. If the content exceeds 25%, the acid resistance, particularly the resistance to buffered hydrofluoric acid, is lowered to result in the increased occurrence of haze at a surface of the glass substrate.

$B_2O_3$ is a component which acts as a flux to lower the viscosity and thereby facilitate melting of the glass. Its content is 5-20%, preferably 5-15%, more preferably 8.5-12%. If the $B_2O_3$ content is less than 5%, its effect as a flux becomes insufficient. On the other hand, the higher $B_2O_3$ content tends to lower the acid resistance. Particularly when the $B_2O_3$ content is greater than 15%, the resistance of the glass decreases against hydrochloric acid and its strain point drops so that the heat resistance is lowered.

As described above, $B_2O_3$ is a component which affects the acid resistance of the glass. The reduction of its content improves the acid durability of the glass. A metal film or an ITO film is formed on a surface of a transparent glass substrate for use in liquid crystal displays. Since such a film is patterned by acid etching, the glass must have a high degree of acid resistance. It is accordingly desirable to reduce the $B_2O_3$ content in the glass. Since boron (B) is a chemical substance designated in the PRTR Act, the reduction of the $B_2O_3$ content is also desirable from an environmental point of view. However, simple reduction of the $B_2O_3$ content may in turn raise other problems, including deterioration of the melting ability and increase of bubbles. In the present invention, the β-OH value of the glass is maintained at a high level. This restrains elevation of glass viscosity that occurs when the $B_2O_3$ content is reduced. It is believed that as the β-OH value increases, the glass viscosity decreases to thereby facilitate reduction of the $B_2O_3$ content.

MgO is a component which lowers the high-temperature viscosity of the glass without a drop of the strain point and thereby facilitates melting of the glass. Its content is 0-10%, preferably 0-7%, more preferably 0-3.5%. If the MgO content is greater than 10%, the glass exhibits a marked reduction in resistance to buffered hydrofluoric acid.

CaO functions in a manner similar to MgO. Its content is 0-15%, preferably 5-10%. If the CaO content is greater than 15%, the glass exhibits a marked reduction in resistance to buffered hydrofluoric acid.

BaO is a component which improves not only the chemical durability but also devitrification tendency of the glass. Its content is 0-10%, preferably 0-7%. If the BaO content is greater than 10%, a strain point drops to deteriorate the heat resistance of the glass.

SrO affects in a manner similar to BaO. Its content is 0-10%, preferably 0-7%, more preferably 0.1-7%. If the SrO content exceeds 10%, the occurrence of devitrification undesirably increases.

For portable devices such as portable telephones and notebook computers, the lightweight device designs have been required to increase handiness during carriage. In order to achieve such lightweight designs, a glass substrate for use therein must be reduced in density. Preferably, this type of glass substrate exhibits a low thermal expansion coefficient as approximate to that (about 30-33×10$^{-7}$/° C.) of a thin-film transistor (TFT) material, specifically a thermal expansion coefficient of 28-40×10$^{-7}$/° C., because a large difference in thermal expansion coefficient between the glass substrate and the TFT material results in the occurrence of warp. BaO and SrO are the glass components which also affect the density and thermal expansion coefficient of the glass. In order to obtain a low-density and low-expansion glass, their total content must be controlled not to exceed 15%, preferably 10%.

ZnO is a component which improves resistance to buffered hydrofluoric acid as well as divitrification resistance. Its content is 0-10%, preferably 0-5%. If the ZnO content exceeds 10%, the occurrence of devitrification of the glass increases. Also, a strain point drops to result in the failure to obtain sufficient heat resistance.

The glass contains at least one of $SnO_2$ and $Sb_2O_3$ as an essential fining component. The $SnO_2$ content is between 0.05 and 1%, with 0.05-0.5% being particularly preferred. The $Sb_2O_3$ content is 0.05-3%, with 0.05-2% being particularly preferred. $SnO_2$ shows a tendency to precipitate in the glass when its content exceeds 1%. If the $Sb_2O_3$ content exceeds 3%, the density of the glass increases. Also, the strain point of the glass is dropped to deteriorate its heat resistance. If the $SnO_2$ or $Sb_2O_3$ content is below 0.05%, it becomes difficult to obtain a sufficient fining effect.

From an environmental point of view, the $As_2O_3$ content should be maintained at as low a level as possible, preferably within 0.4%, more preferably within 0.1%, further preferably within 0.05%.

Besides the aforementioned components, the glass in the present invention may further contain $ZrO_2$, $TiO_2$, $Fe_2O_3$, $P_2O_5$, $Y_2O_3$, $Nb_2O_3$ and $La_2O_3$ in the total amount of up to 5%, for example. $CeO_2$, $MnO_2$, $WO_3$, $Ta_2O_5$, $Nb_2O_5$, $SO_3$, chlorides and fluorides can also be used as a fining agent. However, the present invention finds chlorides as being inferior to the others, because they cause a marked reduction of the water content in the glass. The use amount of a chloride is limited to 0.1% or below, particularly to 0.04% or below, in terms of a $Cl_2$ content calculated from a chlorine component remaining in the glass. It would be advisable to exclude the chloride, if possible.

A method of producing the alkali-free glass substrate of the present invention is below described.

First, a glass batch is prepared such that a glass having a desired composition results.

Then, the prepared glass batch is melted.

Thereafter, the molten glass is formed into a desired shape to obtain a glass substrate. For display applications, the molten glass may be formed into a thin sheet using an overflow downdraw method, a slot downdraw method, or a float method. Use of the overflow downdraw method is particularly preferred because it results in obtaining a glass sheet having a very superior surface quality.

In the above production process, the β-OH value of an alkali-free aluminosilicate glass having the above composition does not exceed 0.485/mm, particularly 0.5/mm, unless a proper measure is positively devised to increase a water content.

For this reason, in the production of the alkali-free glass of the present invention, various measures should be devised to increase the water content. For example, one or more of the following measures may be adopted selectively: (1) a high water-content batch material (e.g., a hydroxide material) is selected; (2) water is added to the batch; (3) a component (e.g., chlorine) which lowers the water content in the glass, if used, is reduced in amount or excluded; (4) oxygen combustion is carried out during melting of the glass, or a water vapor is introduced directly into a melting furnace to thereby increase the water content in an atmosphere inside the furnace; (5) a water vapor bubbling is carried out through the molten glass; and (6) a large-scale melting furnace is employed, or a flow rate of the molten glass is slowed down to thereby allow the molten glass to stay for an extended period in a melting furnace under the atmosphere controlled at a high water content.

The thus-produced, alkali-free glass substrate of the present invention is characterized as including a very small number of bubbles. In general, a percentage of non-defectives drops dramatically owing to bubbles in glass if a substrate is rendered larger in size. Hence, the reduction in number of bubbles is very advantageous for a large-scale substrate such as having an area of 0.5 $m^2$ or larger (specifically 630 mm×830 mm or larger), particularly 1.0 $m^2$ or larger (specifically 950 mm×1,150 mm or larger), further 2.5 $m^2$ or larger (specifically 1,450 mm×1,750 mm or larger). The suitable number of bubbles is within the range that does not exceed 0.2/kg, preferably 0.1/kg, more preferably 0.05/kg.

DESCRIPTION OF PREFERRED EXAMPLES

The following example illustrates the alkali-free glass substrate of the present invention.

TABLE 1

| Sample No. | 1 | 2 | 3 | 4 | 5 |
|---|---|---|---|---|---|
| Glass Composition | | | | | |
| $SiO_2$ | 59.5 | 59.4 | 59.4 | 59.6 | 59.4 |
| $Al_2O_3$ | 15.3 | 15.2 | 15.4 | 14.8 | 15.3 |
| $B_2O_3$ | 9.9 | 9.6 | 9.9 | 9.8 | 9.8 |
| MgO | 0.02 | 0.02 | 0.02 | 0.01 | 0.01 |
| CaO | 5.40 | 5.36 | 5.50 | 5.44 | 5.45 |

TABLE 1-continued

| Sample No. | 1 | 2 | 3 | 4 | 5 |
|---|---|---|---|---|---|
| SrO | 6.10 | 6.09 | 6.07 | 6.07 | 6.01 |
| BaO | 2.20 | 2.19 | 2.19 | 2.21 | 2.19 |
| ZnO | 0.40 | 0.42 | 0.40 | 0.48 | 0.48 |
| $ZrO_2$ | 0.10 | 0.15 | 0.10 | 0.05 | 0.08 |
| $As_2O_3$ | 0.02 | 0.33 | 0.70 | 0.06 | 0.03 |
| $Sb_2O_3$ | 0.92 | 0.77 | 0.36 | 0.90 | 0.94 |
| $SnO_2$ | 0.18 | 0.13 | 0.01 | 0.18 | 0.06 |
| $Cl_2$ | <0.01 | 0.01 | 0.05 | 0.13 | 0.23 |
| β-OH (/mm) | 0.540 | 0.512 | 0.419 | 0.292 | 0.241 |
| Number of Bubbles (/kg) | 0.10 | 0.08 | 0.03 | 0.85 | 35.6 |
| Density (g/cm$^2$) | Unmeasured | 2.502 | Unmeasured | Unmeasured | Unmeasured |
| Expansion Coefficient (×10$^{-7}$/° C.) | Unmeasured | 37.3 | Unmeasured | Unmeasured | Unmeasured |
| Strain Point (° C.) | Unmeasured | 652 | Unmeasured | Unmeasured | Unmeasured |
| Annealing Point (° C.) | Unmeasured | 708 | Unmeasured | Unmeasured | Unmeasured |
| Softening Point (° C.) | Unmeasured | 955 | Unmeasured | Unmeasured | Unmeasured |
| $10^4$ (° C.) | | 1291 | | | |
| $10^3$ (° C.) | | 1459 | | | |
| $10^{2.5}$ (° C.) | | 1570 | | | |

Each sample shown in the Table was fabricated in accordance with the following procedure.

First, a glass batch having the composition specified in the Table was prepared, mixed and then melted in a continuous melting furnace at a maximum temperature of 1,650° C. The molten glass was formed into a sheet by an overflow downdraw method and then cut to obtain an alkali-free substrate sample having a size of 1,000×1,200×0.7 mm for various evaluations. In the fabrication of the sample No. 1, a water content in an atmosphere inside the melting furnace was increased to increase a water content of the resulting glass. In the fabrication of the sample No. 2, a high water-content batch material was selected to increase a water content of the resulting glass.

The β-OH value of each glass was determined by measuring its light transmittance using FT-IR and making a calculation using the following equation:

β-OH value=$(1/X)LOG_{10}(T_1/T_2)$ where,

X=glass thickness (mm);

$T_1$=transmittance (%) at the reference wavelength 3,846 $cm^{-1}$; and $T_2$=minimum transmittance (%) at and near the hydroxyl absorption wavelength 3,600 $cm^{-1}$.

The fineness was evaluated by counting the number of 100 μm and larger size bubbles present in the glass and reducing the result to the number of bubbles per kg of the glass. The density was determined by a well-known Archimedes' method. The thermal expansion coefficient was given in terms of a mean thermal expansion coefficient measured over the 30-380° C. temperature range using a dilatometer. The strain point and annealing point were measured according to the method specified in ASTM C336-71. The softening point was measured according to the method specified in ASTM C338-73. A platinum ball pull-up method was utilized to measure temperatures which correspond to viscosities at $10^4$, $10^3$ and $10^{2.5}$.

UTILITY IN INDUSTRY

The alkali-free glass substrate of the present invention has application on liquid crystal displays and others. For example, it can be used as a glass substrate for flat displays such as electroluminescent displays; as a cover glass for image sensors such as charge-coupled devices, equimultiple solid-state image pickup proximity sensors and CMOS image sensors; and as a glass substrate for hard disks and filters.

The invention claimed is:

1. An alkali-free glass substrate comprising a glass having a β-OH value of at least 0.485/mm and containing $SnO_2$ and/or $Sb_2O_3$.

2. The alkali-free glass substrate as recited in claim 1, wherein said β-OH value is at least 0.5/mm.

3. The alkali-free glass substrate as recited in claim 1, wherein said glass contains, by mass percent, 50-70% of $SiO_2$, 10-25% of $Al_2O_3$, 5-20% of $B_2O_3$, 0-10% of MgO, 0-15% of CaO, 0-10% of BaO, 0-10% of SrO and 0-5% of ZnO.

4. The alkali-free glass substrate as recited in claim 1, wherein the glass has an $As_2O_3$ content of 0.4% or less by mass.

5. The alkali-free glass substrate as recited in claim 1, wherein the $SnO_2$ content is 0.05-1% by mass.

6. The alkali-free glass substrate as recited in claim 1, wherein the $Sb_2O_3$ content is 0.05-3% by mass.

7. The alkali-free glass substrate as recited in claim 1, wherein the glass has a $Cl_2$ content of 0.1% or less by mass.

8. The alkali-free glass substrate as recited in claim 1, wherein said substrate has an area of at least 0.5 m².

9. The alkali-free glass substrate as recited in claim 1, wherein said glass substrate is used as a transparent glass substrate for a liquid crystal display.

* * * * *